(12) United States Patent
Holdampf

(10) Patent No.: US 7,503,613 B2
(45) Date of Patent: Mar. 17, 2009

(54) EXTENDED TRAVEL ROTATING MECHANISM

(75) Inventor: Carl J. Holdampf, Farmington Hills, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 309 days.

(21) Appl. No.: 11/632,759

(22) PCT Filed: Aug. 2, 2005

(86) PCT No.: PCT/CA2005/001197

§ 371 (c)(1),
(2), (4) Date: Jan. 18, 2007

(87) PCT Pub. No.: WO2006/012738

PCT Pub. Date: Feb. 9, 2006

(65) Prior Publication Data

US 2008/0231087 A1    Sep. 25, 2008

(51) Int. Cl.
*B60N 2/02* (2006.01)

(52) U.S. Cl. .................... 296/65.05; 296/66; 296/69; 297/15

(58) Field of Classification Search ............. 296/65.05, 296/65.08, 65.09, 66, 69; 297/15
See application file for complete search history.

(56) References Cited

U.S. PATENT DOCUMENTS 4,869,541 A    9/1989    Wainwright
5,383,699 A  *  1/1995    Woziekonski et al. ..... 296/65.09
6,293,603 B1    9/2001    Waku et al.

FOREIGN PATENT DOCUMENTS

| CA | 2111725 | 6/1995 |
|---|---|---|
| CA | 2310547 | 4/2001 |
| CA | 2427805 | 5/2002 |
| CA | 2498857 | 4/2004 |

OTHER PUBLICATIONS

International Search Report & Written Opinion for PCT/CA2005/001197 Dated Dec. 12, 2005.
Supplementary European Search Report for PCT/CA2005/001197 Dated Aug. 19, 2008.

* cited by examiner

*Primary Examiner*—Dennis H Pedder
*Assistant Examiner*—Pinel E Romain
(74) *Attorney, Agent, or Firm*—Clark Hill PLC

(57) ABSTRACT

A power retracting assembly includes an actuator, an output shaft operatively coupled to the actuator, and an outer plate rotatably coupled to the output shaft about an upper axis. A rigid link fixed to the output shaft pivots about a primary lower axis. Rotation of the outer plate by the output shaft in a first direction causes pivotal movement of the link about the primary lower axis in a second direction, thereby rotating the outer plate and the output shaft about the primary lower axis in the second direction. A bracket pivots about a secondary lower axis. A fastener extends from the outer plate through the bracket. As the outer plate rotates about the primary lower axis, the fastener also rotates, pulling the bracket about the secondary lower axis. A stop extending from the bracket travels along an anchor between a seating end and a stowed end for defining movement of the link and the seat assembly between the seating and stowed positions.

8 Claims, 5 Drawing Sheets

EXTENDED TRAVEL ROTATING MECHANISM

BACKGROUND OF THE INVENTION

1. Field of Invention

The invention relates to a seat assembly for an automotive vehicle. More particularly, the invention relates to a power retracting assembly for automatically moving the seat assembly between a seating position and a stowed position.

2. Description of the Related Art

Automotive vehicles include seat assemblies for supporting occupants within the vehicle. A seat assembly typically includes a generally horizontal seat cushion coupled to a generally vertical seat back. It is known in the seating art to provide a stowable seat assembly movable between a seating position for supporting occupants above a floorpan of the vehicle and a stowed position nested within a recess formed in the floorpan. Generally in such seat assemblies, a leg extends between an upper end pivotally coupled to the seat cushion and a lower end pivotally coupled to the floorpan. An actuator selectively pivots the seat cushion approximately 200 degrees while the lower end of the leg pivots about the floorpan to move the seat between the seating and stowed positions. It is desirable to provide a power retracting system for a vehicle seat assembly which employs a single actuator to pivot the seat cushion while also pivoting the leg.

SUMMARY OF THE INVENTION

According to one aspect of the invention, there is provided a power retracting assembly coupled between a seat assembly and a floor of an automotive vehicle for moving the seat assembly between a seating position spaced above the floor and a stowed position lying flat along the floor. The retracting assembly comprises an inner plate adapted to be fixedly secured to the seat assembly, an output shaft fixedly secured to the inner plate for controlling rotational movement of the inner plate about an upper axis and rotating the seat assembly about the upper axis, and an outer plate rotatably coupled to the output shaft for rotation about the upper axis. A power actuator is operatively coupled to the output shaft for selectively energizing and rotating the inner plate in a first direction and the outer plate in a direction opposite the inner plate. A link extends between a first end fixed to the outer plate and a second end adapted to be pivotally coupled to the floor and rotatable about a primary lower axis, whereby rotation of the outer plate in a first direction about the upper axis causes pivotal movement of the second end of the link about the primary lower axis in a second direction. The link pulls the outer plate about the primary lower axis in the second direction therewith to rotate the seat assembly about the lower axis.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
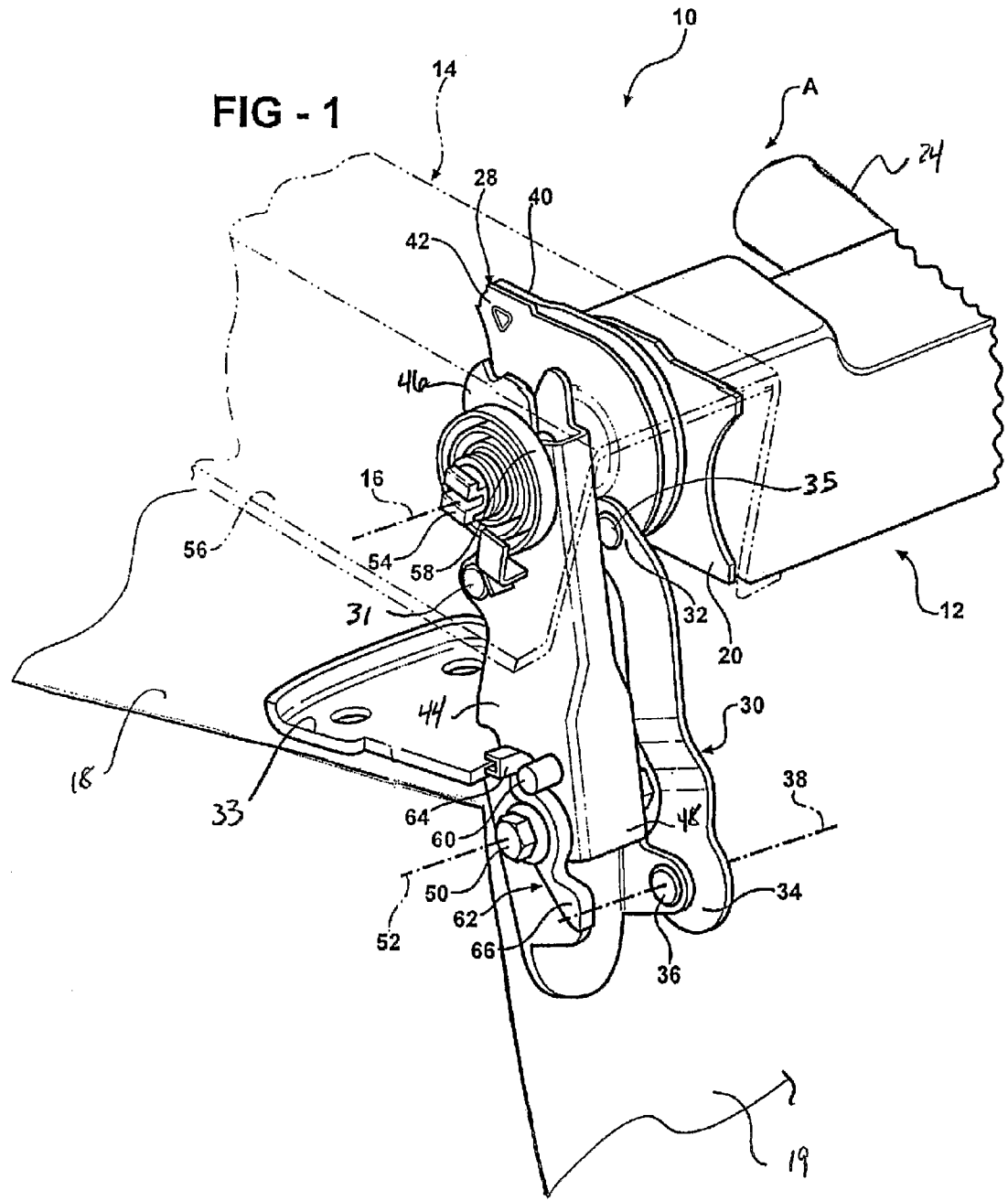
FIG. 1 is a perspective view of a power retracting system for a vehicle seat assembly according to the invention with the seat assembly in a seating position.

Referring to FIG. 1, there is illustrated a portion of a seat assembly 10 including a power retracting assembly 12 according to the invention. The seat assembly 10 includes a seat cushion frame 14 for supporting a seat occupant above a floorpan 18 of a vehicle. The seat assembly 10 pivots between a seating position A, shown in FIG. 1, and a stowed position B, shown in FIG. 5, recessed within a well 19 in the floor pan 18.

Figure 2:
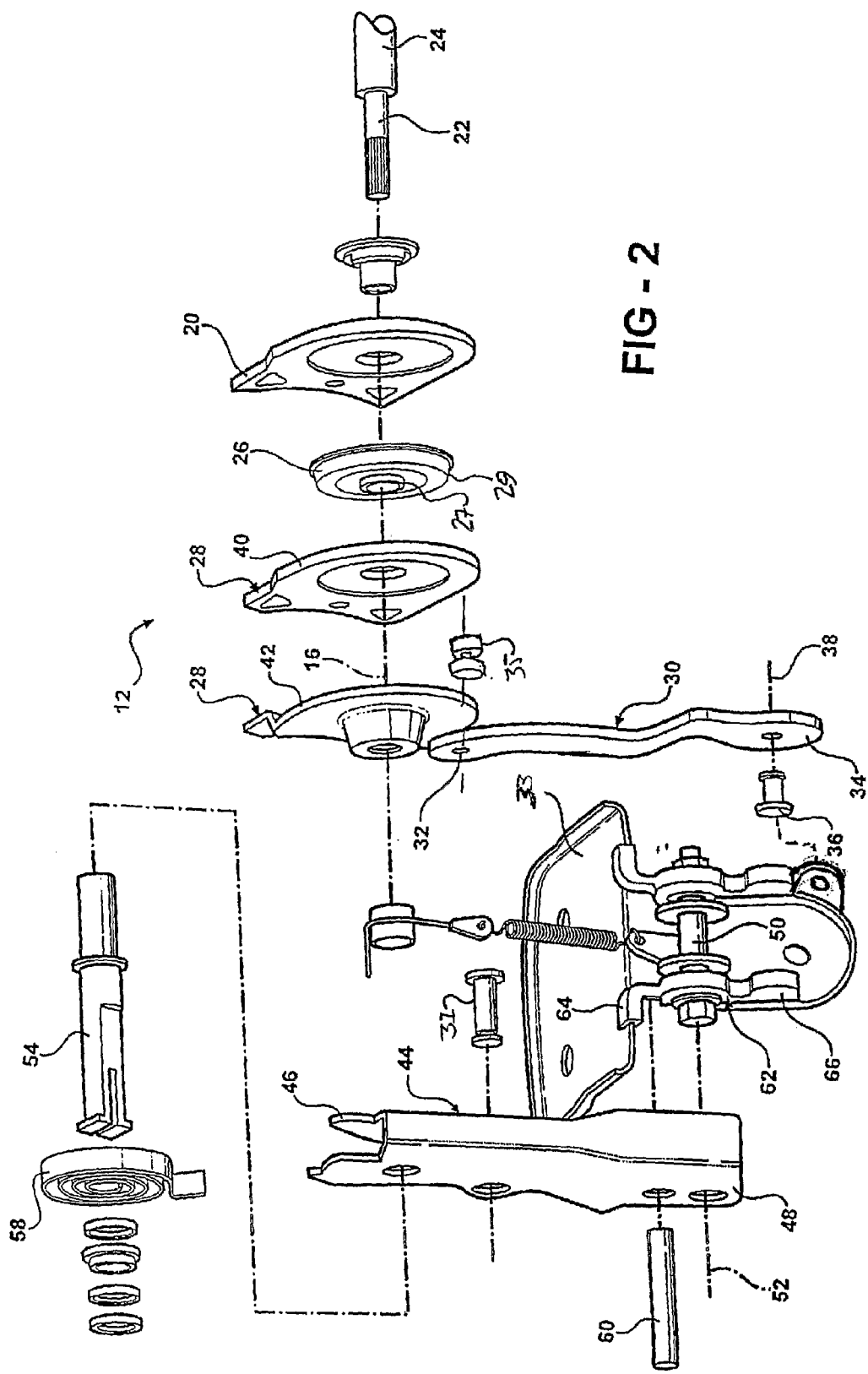
FIG. 2 is an exploded view of the power retracting system of FIG. 1.
Figure 5:
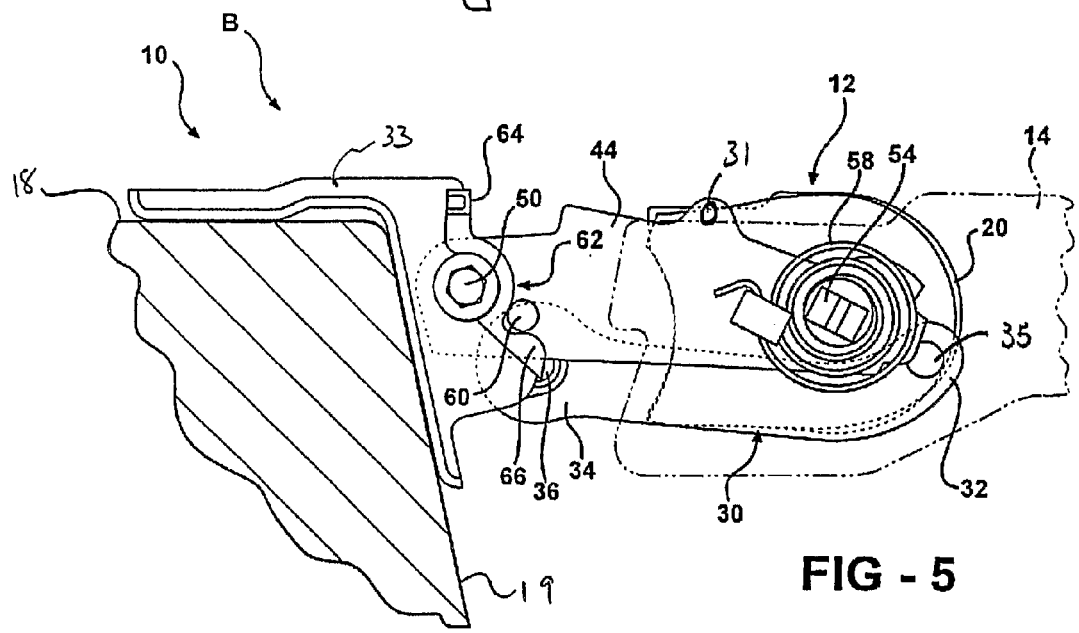
FIG. 5 is a side view of the power retracting system of FIG. 1 with the seat assembly in the stowed position.
Figure 6:
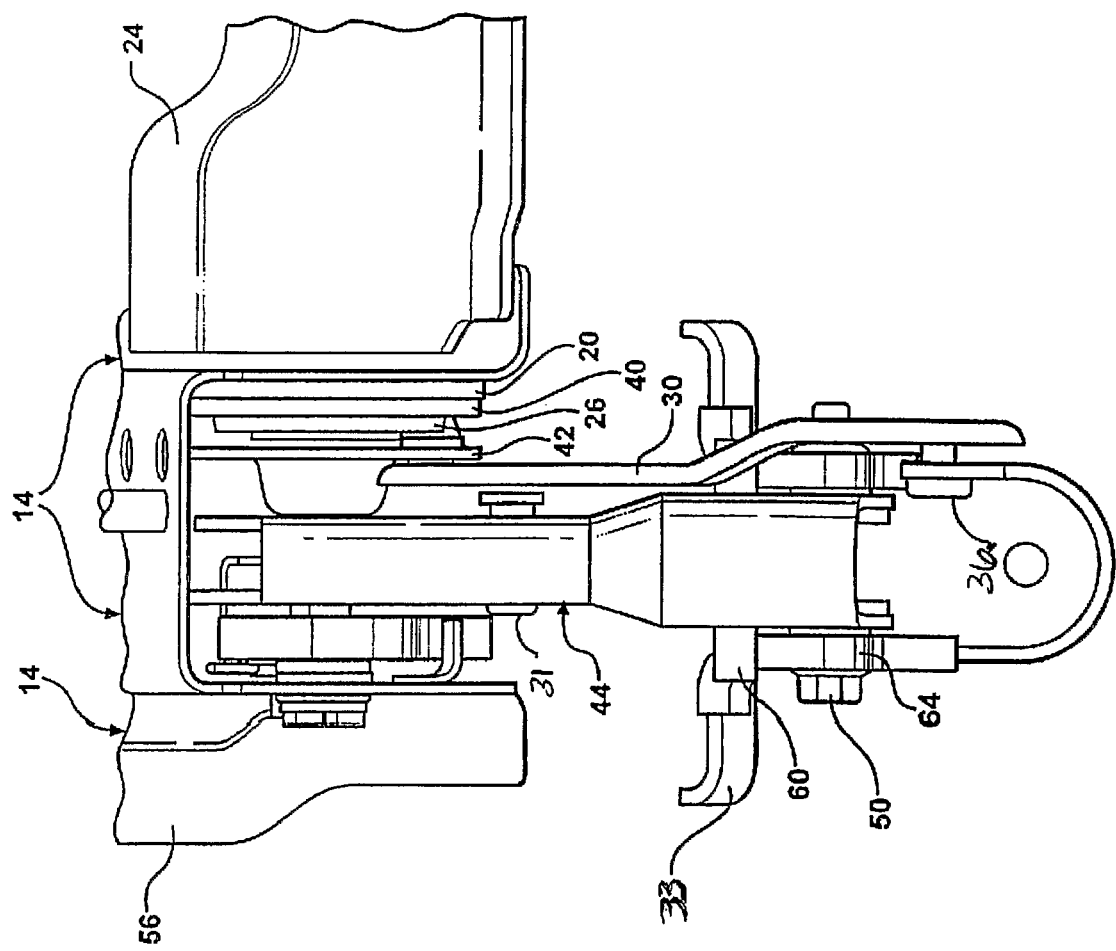
FIG. 6 is a rear view of the power retracting system of FIG. 1.

The seat cushion frame 14 pivots about an upper axis 16 approximately 180 degrees such that it supports a seat occupant when the seat assembly 10 is in the seating position A (FIG. 1), and provides a load surface when the seat assembly 10 is in the stowed position B (FIG. 5). As best seen in FIGS. 1 and 2, an inner plate 20 is secured to the seat cushion frame 14 and rotates about the upper axis 16 defined by an output shaft 22, which is selectively energized by an actuator 24. Preferably the actuator 24 is bi-directional such that energization rotates the inner plate 20 and the seat cushion frame 14 either in a first direction toward the stowed position B or in a second direction toward the seating position A. In the preferred embodiment, the output shaft 22 engages a transmission, generally indicated at 26.

To start the movement of the seat cushion frame 14 away from its seating position, the power retracting system 12 includes an outer plate 28, which is also coupled to the output shaft 22 and disposed adjacent the inner plate 20. The outer plate 28 rotates in a direction opposite that of the output shaft 22, so that as the actuator 24 rotates the output shaft 22 in the first direction, the outer plate 28 rotates in the second direction. Similarly, as the actuator 24 rotates the output shaft 22 in the second direction, the outer plate 28 rotates in the first direction. In the preferred embodiment, the transmission 26 seats between the outer plate 28 and the inner plate 20, such that rotation of the transmission 26 by the output shaft 22 rotates the outer plates 28 in the opposite direction thereof.

The transmission 26 is mounted to the output shaft 22. An inner sleeve 27 is keyed with the output shaft 22 and rotates therewith. The transmission 26 includes a planetary gear mechanism (not shown) within a casing 29. The planetary gear mechanism creates an opposing rotational force for the casing 29, which rotates opposite that of the output shaft 22. The casing 29 is fixedly secured to the outer plate 28 to rotate until the outer plate 28 abuts against a stop 31, which is a pin mounted to a bracket 44, discussed subsequently.

A rigid link 30 extends between a first end 32 fixed to the outer plate 28 via a pin 35 and a second end 34 pivotally attached to a mounting bracket 33 by a pin 36 defining a primary lower axis 38. In the preferred embodiment, the outer plate 28 includes a rotating plate 40 joined to a fastener plate 42, with the rotating plate 40 coupled to the transmission 26 and the link 30 fixed to the fastener plate 42. It should be appreciated by those skilled in the art that the outer plate 28 may include a single plate. Rotation of the outer plate 28 in the second direction rotates the first end 32 of the link 30 with respect to the upper axis 16 in the second direction since the first end 32 is fixed to the outer plate 28. Since the link 30 is rigid and movement of the second end 34 of the link 30 is restrained in two directions by the pin 36, rotation of the first end 32 with respect to the upper axis 16 in the second direction forces the second end 34 of the link 30 to pivot about the primary lower axis 38 in the first direction. Pivotal movement of the link 30 about the primary lower axis 38 also pulls the outer plate 28, the output shaft 22, the inner plate 20, and the seat cushion frame 14 about the primary lower axis 38 in the first direction, pulling the seat assembly 10 toward the stowed position B. Rotation of the outer plate 28 in the first direction has the opposite effect, thereby pulling the seat assembly 10 about the primary lower axis 38 toward the seating position A.

Figure 3:
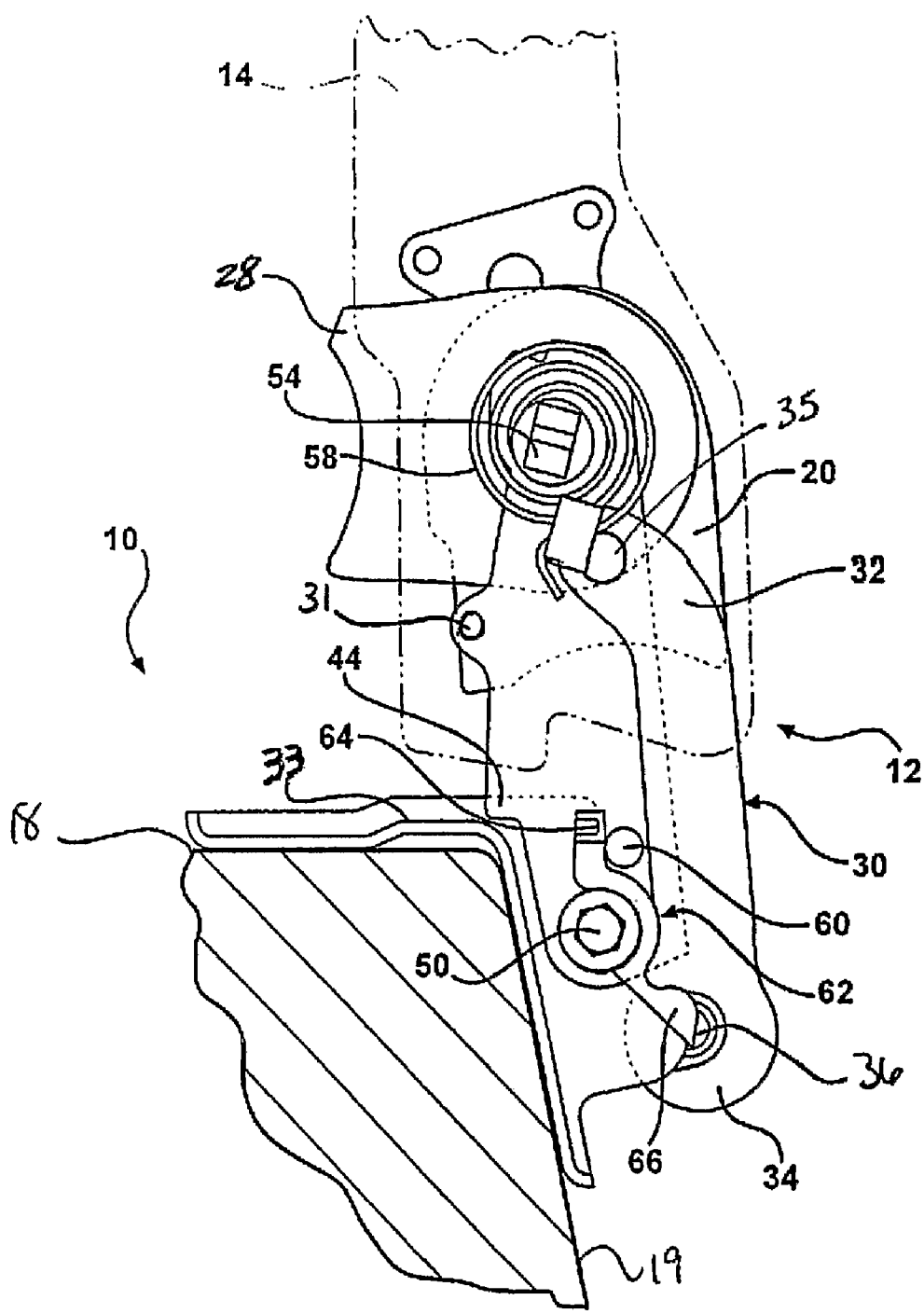
FIG. 3 is a side view of the power retracting system of FIG. 1 with the seat assembly between the seating position and a stowed position.
Figure 4:
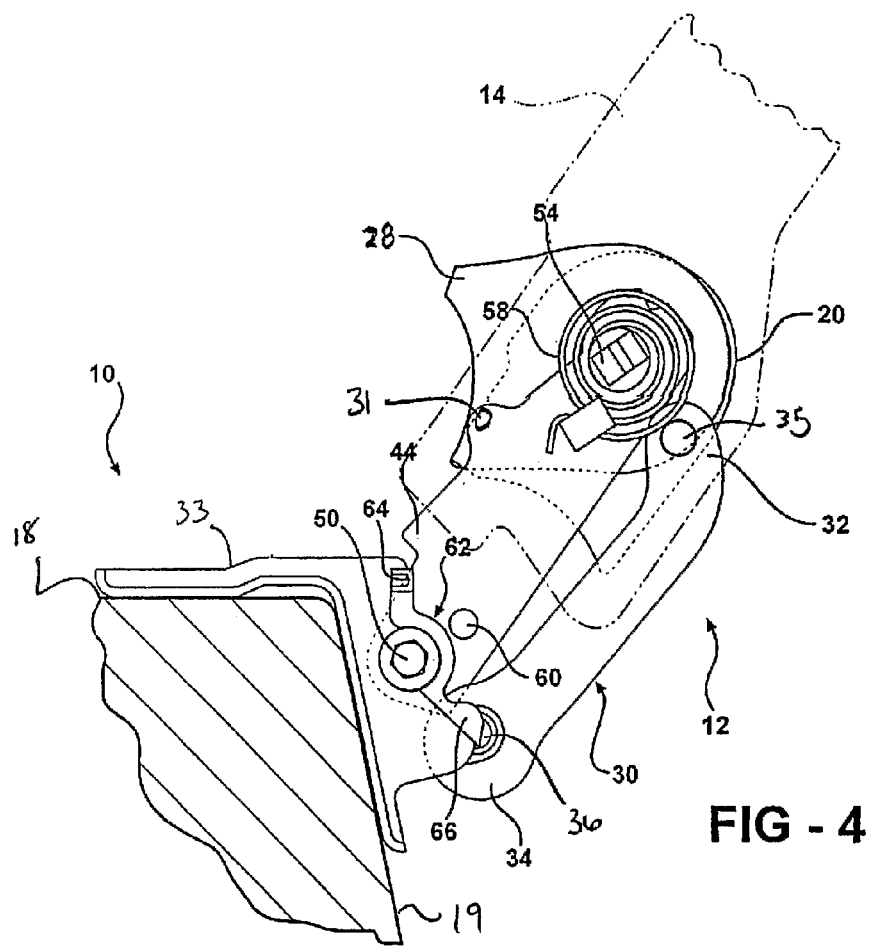
FIG. 4 is a side view of the power retracting system of FIG. 1 with the seat assembly between the seating and stowed positions.

Once the seat cushion 14 has been pivoted into an intermediate, upright position, best shown in FIG. 3, a bracket 44 facilitates the pivoting of the seat assembly 10 about a pin 50 defining a secondary lower axis 52. The bracket 44 extends between a first end 46 and a second end 48 pivotally attached to the mounting bracket 33 by the pin 50. A fastener 54 extends from the outer plate 28 through the first end 46 of the bracket 44 and into an outer member 56 of the seat cushion frame 14. A coil spring 58 disposed about the fastener 54 may be included to move legs (not shown) of the seat assembly 10 as the seat assembly 10 moves between the seating A and stowed B positions and/or provide a biasing spring assist to the actuator 24 for rotation of the seat assembly 10. As the link 30 pivots about the primary lower axis 38 pulling the outer plate 28 therewith, the link 30 also pulls the fastener 54, rotating the bracket 44 about the secondary lower axis 52. The bracket 44, being attached to the outer member 56 of the seat cushion frame 14, thus secondarily pulls the seat cushion frame 14 therewith.

A bracket stop 60 extends from the bracket 44 and travels along an anchor 62 between a seating end 64 and a stowed end 66. When the seat assembly 10 is in the seating position A, the bracket stop 60 rests adjacent the seating end 64. As the seat assembly 10 travels in the first direction, the bracket stop 60 travels along the guide toward the stowed end 66. When the bracket stop 60 reaches the stowed end 66, rotation of the bracket 44 about the secondary lower axis 52 is prevented, which also prevents further rotation of the link 30 about the primary lower axis 38. Since the link 30 is locked in place, the outer plate 28 is also locked in place.

In operation, the seat assembly 10 starts in the seating position A. Actuation of the actuator 24 rotates the transmission 26 to rotate the inner plate 20 in the first direction to rotate the seat cushion frame 14 about the first axis 16 in the first direction. The transmission 26 simultaneously rotates the outer plate 28 in the second direction. When the inner plate 20 and seat back 14 reach the intermediate, upright position, the pin 31 stops the rotation thereof. The actuator 24 continues, however, to rotate the output shaft 22. This forces the bracket 44 to pivot about the pin 50 because the link 30 creates such a relationship therebetween. When the bracket stop 60 reaches the stowed end 66 of the anchor 62, further rotation of the outer plate 28 is prevented and the seat assembly 10 is in the stowed position B.

The invention has been described here in an illustrative manner, and it is to be understood that the terminology used is intended to be in the nature of words or description rather than limitation. Many modifications and variations of the present invention are possible in light of the above teachings. It is, therefore, to be understood that within the scope of the appended claims, the invention may be practiced other than as specifically enumerated within the description.

What is claimed:

1. A power retracting assembly coupled between a seat assembly and a floor of an automotive vehicle for moving the seat assembly between a seating position spaced above the floor and a stowed position lying flat along the floor, said retracting assembly comprising:

an inner plate adapted to be fixedly secured to the seat assembly;

an output shaft fixedly secured to said inner plate for controlling rotational movement of said inner plate about an upper axis and rotating the seat assembly about said upper axis;

an outer plate rotatably coupled to said output shaft for rotation about said upper axis;

a power actuator operatively coupled to said output shaft for selectively energizing and rotating said inner plate in a first direction and said outer plate in a direction opposite said inner plate; and a link extending between a first end fixed to said outer plate and a second end adapted to be pivotally coupled to the floor and rotatable about a primary lower axis, whereby rotation of said outer plate in a first direction about said upper axis causes pivotal movement of said second end of said link about said primary lower axis in a second direction, said link pulling said outer plate about said primary lower axis in said second direction therewith to rotate the seat assembly about said lower axis.

2. A power retracting assembly as set forth in claim 1 further including a transmission operatively coupled between said inner plate and said outer plate for converting rotational movement of said output shaft to said outer plate in said direction opposite said rotation of said inner plate.

3. A power retracting assembly as set forth in claim 2 further including a mounting bracket adapted to fixedly support said power retracting assembly between the seat assembly and floor of the vehicle.

4. A power retracting assembly as set forth in claim 3 further including an elongated support bracket extending between a first end coupled to the seat assembly and a second end pivotally coupled to said mounting bracket defining a secondary lower axis for supporting and rotationally guiding the seat assembly between the seating position and the stowed position.

5. A power retracting assembly as set forth in claim 4 further including a stop pin coupled to said support bracket for engagement with said inner plate to stop rotational movement of said inner plate and transfer rotational movement from said output shaft to said outer plate in a direction opposite said inner plate.

6. A power retracting assembly as set forth in claim 5 including an anchor fixedly secured to said mounting bracket adjacent said second end of said support bracket and a bracket stop pin projecting from said second end of said support bracket for cooperative engagement with said anchor, said anchor having opposite seating and stowed ends for abutting said bracket stop pin to prevent further rotation of said support bracket about said secondary lower axis and define said seating and stowed position of the seat assembly.

7. A power retracting assembly as set forth in claim 6 further including a fastener extending outwardly from said outer plate for interconnecting said first end of said support bracket to the seat assembly.

8. A power retracting assembly as set forth in claim 7 further including a coil spring wound between said fastener and said first end of said support bracket for provide a spring bias assist to said rotation of the seat assembly between said seating and stowed positions.

* * * * *